April 28, 1931. J. HAHN 1,802,554
ROTARY FLYING SHEARS
Original Filed March 10, 1928   3 Sheets-Sheet 2

Inventor
Johann Hahn
By Kerr Hudson & Kent
Attorneys

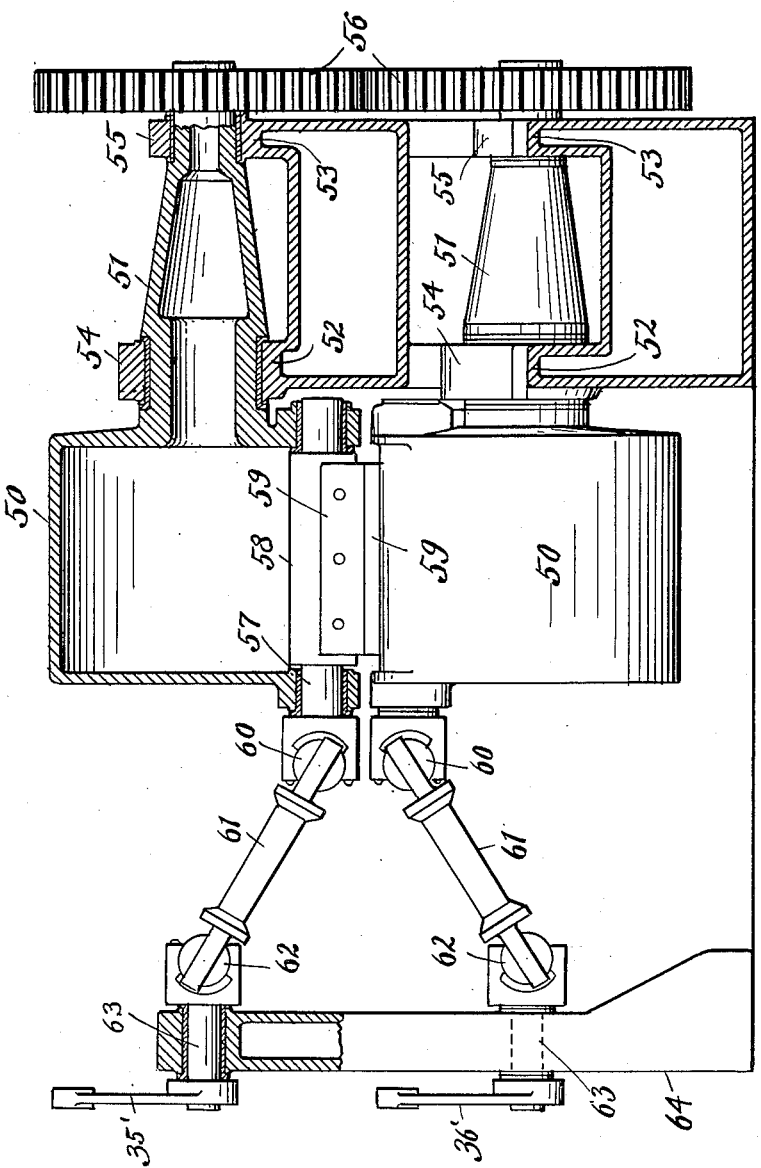

Patented Apr. 28, 1931

1,802,554

UNITED STATES PATENT OFFICE

JOHANN HAHN, OF PITTSBURGH, PENNSYLVANIA, ASSIGNOR, BY MESNE ASSIGNMENTS, TO UNITED ENGINEERING & FOUNDRY COMPANY, OF PITTSBURGH, PENNSYLVANIA, A CORPORATION OF PENNSYLVANIA

ROTARY FLYING SHEARS

Application filed March 10, 1928, Serial No. 260,572. Renewed March 17, 1931.

This invention relates to improvements in flying shears, that is, shears which are adapted to cut continuously moving material such as strips, bars, rods, etc., without interruption to the movement of such material.

One of the objects of the invention is the provision of a shearing mechanism of the character stated, which will operate rapidly and efficiently and produce a good clean cut.

Another object is the provision of means for maintaining the shearing knife or knives in a given angular relation to the material being cut throughout the cutting operation.

Another object is the provision of simple means for disabling the shearing knife or knives during a portion of the movement of the same.

Still another object is the provision of rotary knife carriers with means dependent upon the rotation of the same for maintaining the knife or knives in the given angular relation stated.

A further object is the provision in a rotating shear of means for withdrawing the shearing knife during certain revolutions of the same, whereby the length of the material cut may be made any desired multiple of the approximate distance traveled by the knife in making a complete revolution.

Other objects and features of novelty will be apparent as I proceed with the discription of those embodiments of the invention which, for the purposes of the present application, I have illustrated in the accompanying drawings, in which Figure 1 is a diagrammatic view illustrating the preferred embodiment of the invention.

Figure 4 is an elevational view, partly in section, illustrating a modified form of the invention.

Figure 1:
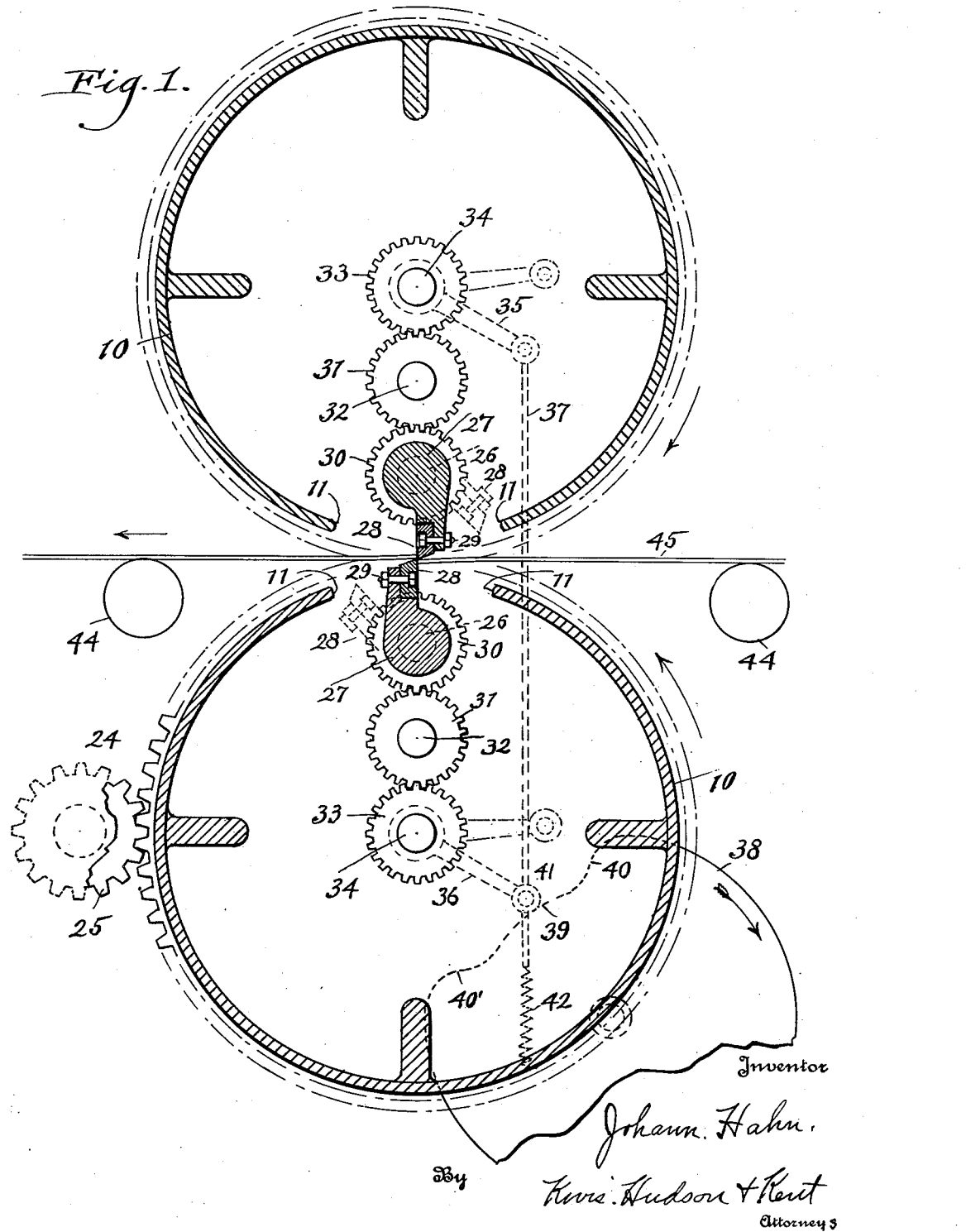

The preferred form of the invention, illustrated in Figures 1 and 2, will first be described. A pair of carriers 10 are employed. Preferably they take the form of drums which are closed throughout their peripheries, except for slot-like openings 11 parallel with the axes of the drums. These drum carriers 10 are mounted to turn upon parallel horizontal axes arranged in the same vertical plane upon opposite sides of the line of feed of the material to be sheared. At the right hand end of the machine, as viewed in Figure 2, these drums are supplied with integral trunnions 12 running in bushings 13 supported in bearings 14 and 15 formed in the frame of the machine. At the left hand end of the machine these drums are each closed by a wall 16, but at this end they are equipped with extensions 17, each including a peripheral and end wall portion, thereby providing a separate gear housing 18, as shown in the upper part of Fig. 2. The extension 17 is removably secured to the drum 10 by screws 19 or the like. On the outer sides of the extensions 17 I form trunnions 20 which run in bushings 21 supported in upper and lower bearings 22 and 23, respectively. At the right hand end of the machine the carrier drums 10 have attached thereto ring gears 24 of the same size and number of teeth, which intermesh and thereby insure rotation of the drums at the same speed in opposite directions. Any suitable means may be provided for transmitting power to one or the other of the drums, such for instance as a drive gear 25 meshing with the lower gear 24, (see Fig. 1). The speed of rotation of the drums is so regulated that the travel of the shearing knives, hereafter described, will be at substantially the same speed as the travel of the work through the machine. Means for accomplishing such regulation are not herein illustrated, as they are well within the skill of a mechanic versed in the art, and in themselves constitute no part of the present invention.

Each of the drum carriers 10 has a shaft 26 mounted in its side walls, this shaft having a bearing in the right hand side wall, one in the wall 16 and one in the extension 17. Secured to this shaft 26 within the drum is a support 27, upon which a shearing knife 28 is mounted in some suitable manner, as by means of bolts 29. On this same shaft within the housing 18 I fix a spur gear 30. The gear 30 meshes with a gear 31 fixed upon a short shaft 32 which has a bearing in the wall 16 and extension 17, and this gear in turn meshes with a gear 33 that is fixed upon a shaft 34 which has a bearing in the wall 16 and trunnion 20 and which extends entirely through the trunnion 20. The gears 30 and 33 are of the same size and number of teeth. The outer ends of the upper and lower shafts 34 have fixed thereto crank arms 35 and 36, respectively, which are connected together by a link 37. When the knives 28 are in the shearing position, as illustrated, the crank arms 35, 36 and the link 37 are in the position diagrammatically illustrated in Figure 1 in full lines. In the same figure I have indicated in dotted lines the inoperative positions of the knives 28 and the corresponding inoperative positions of the parts 35, 36 and 37. The gears 33 remain stationary, except for an intermittent motion through the small angle corresponding to the angle between the two illustrated positions of the crank arms 35 and 36. Consequently the gears 33, as they revolve, owing to the motion of the drums 10, turn upon their axes, and through the intermediacy of the gears 31, rotate the gears 30 through one revolution with respect to the drums for each revolution of the drums, ignoring for the moment the intermittent motion mentioned. For this reason it is possible for the knives 28 to be maintained at a given angle with respect to the horizontal throughout the rotation of the drums, whether the knives are set in the vertical plane, as shown in full lines, or in inclined planes, as shown in dotted lines.

The machine is capable of cutting elongated material into measured lengths which may be any multiple of the distance, or approximate distance, traveled by one of the knives during the complete rotation of its drum. Now in order to cause the shearing operation to take place during only one of several revolutions, as for instance, one in eight, I provide suitable means for holding the crank arms 35 and 36 in their dot and dash line positions during, say seven out of the eight revolutions, and in the dotted line position during the remaining revolution, or at least during a considerable portion of that revolution. The particular means to be employed for this purpose may be varied, but as an example of one such means I have illustrated a cam 38, which throughout the greater portion of its extent has an outer circular contour. A small angle of the cam 38 is formed to an inner circular contour 39, and these two circular contours are connected by cam surfaces 40 and 40'. The cam 38 is so geared to the machine (by driving means not shown) as to turn through one revolution for every eight revolutions of the drums 10, that is in the example stated. A roller 41 supported in the extremity of the crank arm 36 may be provided to run upon the surface of the cam, and this roller may be held to the cam if desired by a tension spring 42 attached to the link 37 and anchored in the base of the machine, as indicated at 43, although, of course, other equivalent means may be employed. In order to change the length of the material cut from the moving piece it is only necessary to substitute a different cam, or change the gear ratio in the drive to the cam.

The material to be sheared is fed along a conveyor which may comprise supporting rollers 44, the material itself being indicated in Figure 1 at 45.

Figure 2:
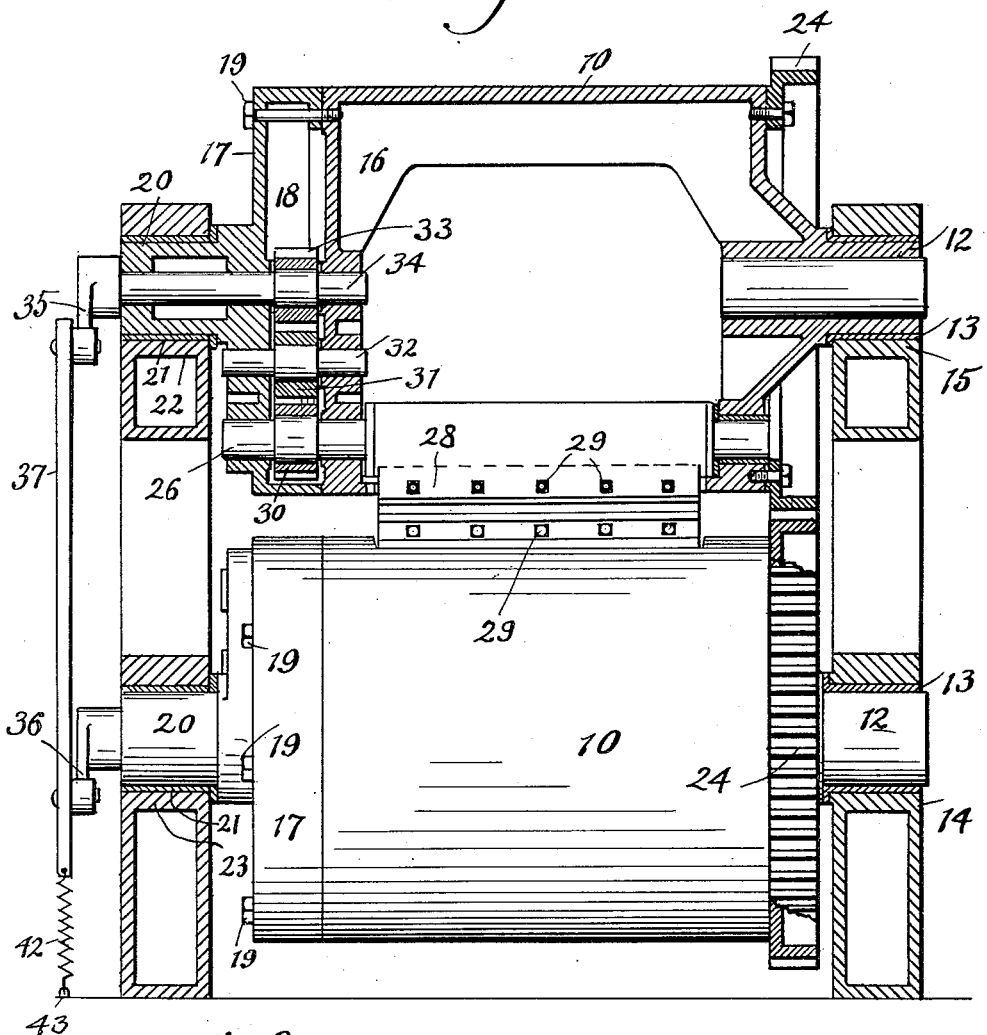
Figure 2 is an elevational view partly in section of a machine corresponding to the disclosure of Fig. 1.
Figure 3:
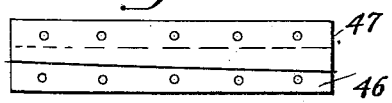
Figure 3 is a detail view illustrating a modified knife structure.

The knives 28, as shown in Figure 2, have parallel cutting edges. In Figure 3 I have illustrated a modified construction of knives, in which there is a lower knife 46 with a horizontal cutting edge, and an upper knife 47 with an inclined cutting edge. With this arrangement of shearing knives the cut takes place progressively across a flat strip of metal, which method of operation has certain advantages over performing the cut simultaneously across the entire surface of the strip.

Referring now to Figure 4, two carrier drums are illustrated, each furnished with an axially extending trunnion 51 rotatably mounted in two separated bearings 52 and 53, having bearing caps 54 and 55 respectively. On the outer ends of the trunnions 51 are intermeshing gears 56 of the same size to insure rotation of the drums at the same speed in opposite directions. Each of these drums 50 carries a shaft 57 with a knife support 58 and a knife 59. The shafts 57 outside the drums 50 are connected by universal joints 60 with transmission shafts 61, the outer ends of which are connected by universal joints 62 with short shafts 63 rotatably mounted in a frame member 64, the shafts 63 being in alignment with the trunnions 51. On the outer extremities of the shafts 63 there are fixed crank arms 35' and 36' corresponding to the arms 35 and 36 in the previously described embodiment of the invention, and adapted to be shifted through a small angle by means similar or equivalent to that described for use with the arms 35 and 36 and for the same purpose.

*Operation*

Assuming that the material 45 is being fed along in the direction indicated by the arrow in Figure 1, continuously from a rolling mill or the like, and that the drums 10 are geared to turn at the proper speed, that is, so as to cause the knives 28 when in proximity to the material 45 to travel at the same speed therewith, and assuming that the proper cam 38 is in position and geared down to turn at the desired fraction of the speed of rotation of the drums 10 to produce the length of material desired, and assuming that the parts of the shearing machine are in the positions illustrated in Figure 1, that is, at the point of making a cut, the continued rotation of the drums in the directions indicated by the arrows causes the shafts 26 to move toward the left in arcs of circles. The arms 35 and 36 are temporarily stationary and the gears 33 are, therefore, fixed against rotation. Consequently the rotation of the drums 10 revolves the gears 31 and 30 at a rate which would produce a complete revolution of the gears 30 in one revolution of the drums. This speed of movement of the gears 30 keeps the knives 28 in the same vertical plane as they move toward the left from the position shown. The arcuate motion separates the knives and as they move out of the way the sheared ends of the material 45 spring back into line, and thus the sheared length is pushed along by the continuous strip behind it. As the shafts 26 continue in their circular paths the knives 28 continue to hold their vertical positions until the cam 38 has traveled far enough to cause its circular contour 39 to leave the roller 41 and to cause the cam surface 40' to shift the roller 41 upwardly onto the outer circular contour of the cam. When this occurs the arms 35 and 36 move to their dotted line positions and the gears 33 are rotated through a small angle. This rotation is transmitted through the gears 31 and 30 to the knives 28 which then rotate away from the vertical into inclined positions corresponding to the dotted line positions of Figure 1. Thereafter, and while the roller 41 runs upon the outer contour of the cam 38 which it ordinarily does through several revolutions, the knives 28 hold the same inclination continously, and, therefore, do not emerge through the slots 11 when the latter come into proximity with the moving material 45. No shearing takes place, therefore, until the surface 40 on the cam 38 comes into engagement with the roller 41 and permits the latter to descend to the inner circular contour 39 of the cam, when the arms 35 and 36 again descend to their lower positions and the knives 28 are shifted to their vertical positions. The machine is so timed that this shift takes place somewhat after the shafts 26 have passed their positions of closest proximity and before they again come into proximity on their upward travel toward the material 45. The cam contour 39 is long enough to maintain the blades 28 in vertical position as they move in arcuate paths toward each other, make the cut, and again move in arcuate paths away from each other, after which the cam surface 40' again acts to swing the blades to inclined or retracted position. The maintaining of the blades in their vertical position throughout their contact with the material 45 is highly important, inasmuch as it results in a good clean shearing action at right angles to the surface of the material.

The embodiment of the invention illustrated in Figure 4 causes the knives 59 to partake of identically the same motions as the knives 28 of the first embodiment, although the result is accomplished in a different manner. A given setting of the crank arms 35' and 36' and the rotation of the drums 50 carries the shafts 57 around in circular paths but keeps them always with the same side uppermost. Hence the knives 59 may be maintained either in vertical or in inclined retracted position, depending upon the position of the arms 35' and 36'.

Inasmuch as the two shearing knives are maintained constantly parallel to each other throughout the shearing operation, it is entirely feasible to employ in connection with the knives means for interguiding them upon each other, whereby slight inaccuracies of construction, looseness in gearing, or the like may be compensated for.

While in both forms of the invention above described I have shown duplicate mounting and operation of the knives above and below the material to be sheared, it will be obvious that such duplication is not essential.

Numerous other variations from the particular disclosure herein are possible without departing from the spirit of the invention, and, therefore, I desire it to be understood that the present disclosure is for the purpose of illustrating the invention only and is not to be construed as amounting to a limitation upon the scope of the invention.

Having thus described my invention, what I claim is:

1. In a machine for shearing elongated material into lengths as it is fed through the machine, a carrier mounted upon one side of the material upon an axis at right angles to the direction of movement of the material, a shearing knife mounted in said carrier, means for driving said carrier so that said knife when in cutting position shall have a peripheral speed substantially equivalent to the speed of feed of said material, whereby the forward movement of the carrier through an arc causes the knife to approach said material for a shearing cut and then recede, means for maintaining said knife in a certain angular relation with respect to the path of travel of the material throughout a given arc of movement of said carrier, and means for changing said angular relation during the movement of said carrier.

2. In a machine for shearing elongated material into lengths as it is fed through the machine, carriers located upon opposite sides of the material and movable at the same speed in arcs in the general direction of the material movement, a shearing knife mounted in each of said carriers, said knives approaching each other up to the point where the arcs of movement are close together and then receding, means operable by the movement of the carriers for holding the knives in parallel planes throughout their movement in the said arcs, whereby they come together in shearing relation as the carriers most closely approach each other during their forward movement, and means for moving said knives upon their respective carriers away from shearing position during the movement of the carriers.

3. In a machine for shearing elongated material into lengths as it is fed through the machine, rotary carriers located upon opposite sides of the material and having their adjacent peripheral portions movable at the same speed in arcs in the general direction of the material movement, an axle eccentrically mounted in each of said carriers, said axles being parallel to each other and lying in a plane at right angles to the direction of movement of the material, whereby said axles approach each other up to the point where the arcs of movement are closest together and then recede, a shearing knife mounted on each of said axles, means for turning said axles in their carriers to maintain said knives in parallel relation with their cutting edges passing each other as the carriers move forward, and means for additionally rotating said axles in their carriers whereby the knives are swung away from shearing relation.

4. In a flying shear, a carrier rotatable upon an axis mounted at right angles to the direction of movement of the material on one side thereof, a shearing knife mounted in said carrier, means for driving said carrier so that said knife when in cutting position shall have a peripheral speed substantially equivalent to the speed of feed of said material, whereby the rotation of the carrier causes the knife to approach said material once during each revolution of the carrier for a shearing cut and then to recede therefrom, means for maintaining the said knife in a given angular position throughout the contact of the knife with the material, and means for automatically changing said angular position during the rotation of the carrier to maintain said knife out of operative position during certain revolutions of the carrier.

5. In a flying shear, a carrier rotatable upon an axis mounted at right angles to the direction of movement of the material on one side thereof, a shearing knife mounted in said carrier, means for driving said carrier so that said knife when in cutting position shall have a peripheral speed substantially equivalent to the speed of feed of said material, whereby the rotation of the carrier causes the knife to approach said material once during each revolution of the carrier for a shearing cut and then to recede therefrom, means for maintaining the said knife at a given angle throughout the contact of the knife with the material, and means for withdrawing said knife from operative position during certain revolutions of the carrier.

In testimony whereof, I hereunto affix my signature.

JOHANN HAHN.